3,564,001
METHOD FOR PRODUCTION OF BENZOTRIAZOLE
John W. Long III, Sylvania, Ohio, assignor to The Sherwin-Williams Company, Cleveland, Ohio, a corporation of Ohio
No Drawing. Filed Feb. 19, 1968, Ser. No. 706,641
Int. Cl. C07d 55/04
U.S. Cl. 260—308                                   12 Claims

ABSTRACT OF THE DISCLOSURE

A method for the preparation of benzotriazole which involves acid treatment of benzotriazole reaction mixtures combined with subsequent purifying steps including a distillation to yield a product of high quality useful in the photographc industry, yet which is relatively inexpensive to make when compared to prior art processes.

BACKGROUND OF THE INVENTION

(1) Field of the invention

Benzotriazole is an organic compound which is widely used as an anticorrosion agent in synthetic detergents and antifreezes. It is also used as an intermediate in the preparation of fungicides and dyes and, when highly pure, as a photographic chemical. The compound, usually formed by diazotization of o-phenylenediamine, is relatively expensive to make, and ways are continually being sought to produce it more economically, and at the same time to maintain a high purity.

(2) The prior art

As practiced in the prior art (U.S. Pat. No. 2,861,078), benzotriazole is produced by diazotization. The method comprises effecting a mixture, in an aqueous system, of a nitrite salt and o-phenylenediamine, and adding to such mixture an acid reacting substance which reacts with the nitrite to form a salt and nitrous acid. The nitrous acid in turn reacts with o-phenylenediamine to form o-aminophenyl diazonium acetate which cyclizes to benzotriazole. The reaction mixture is then cooled and the crystalline benzotriazole is separated and further processed. The acid reacting substance referred to above is selected from the group consisting of aliphatic monobasic acids, ($H_2PO_4$) salts, citric acid, carbonic acid, glycolic acid, and aliphatic dibasic acids such as oxalic acid, malonic acid, succinic acid, and diglycolic acid.

The essence of the above invention lies in the use in the diazotization reaction of the specific acid reacting substances disclosed therein, and it makes little difference in what sequence the various individual components are added. The diazotization can be carried out, for example, by mixing o-phenylenediamine and acetic acid in water, and then adding the mixture to the aqueous nitrite solution, or use can be made of a continuous process where a stream of o-phenylenediamine and acetic acid in aqueous solution is fed into a stream of aqueous nitrite solution. In the latter instance stoichiometric quantities should be used.

In still another method benzotriazole is made by reacting o-phenylenediamine with an alkali metal nitrite in an aqueous acidic medum, initially at a low temperature in the range of from about 0° to 5° (all temperatures reported herein are in degrees centigrade), and then at a higher temperature above about 50°; or, as suggested in U.S. Pat. No. 3,227,726, the reaction is carried out entirely at elevated temperatures within the range of from about 50° to reflux in an aqueous acidic medium comprising an aqueous solution of formic, acetic or propionic acid or of sulfuric acid in combination with an alkali metal salt of one of the foregoing acids. It has been determined, however, that the temperature at which the reaction is initially conducted has little or no effect on the end product. Thus, whether or not the initial reaction temperature is from 0° to 5°, or above 50° is of little consequence.

The initial products formed by the above described methods are crude and not of high quality. In order to obtain a high quality product the benzotriazole thus formed must be further processed by several carbon treatments, recrystallization, etc. These processing steps are both expensive and time-consuming. It can thus be appreciated that if these further processing steps could be substantially eliminated, and a high quality product still be obtained, significant economic savings could be achieved.

It is an object of this invention to provide an improved method of producing benzotriazole.

It is a further object of this invention to provide an improved method of producing benzotriazole of photo grade quality.

It is a still further object of this invention to provide an improved method of producing benzotriazole which allows benzotriazole to be produced more economically than has heretofore been possible.

It is another object of this invention to provide a method of producing benzotriazole having improved color characteristics.

Other objects and benefits of this invention will be apparent from the description which follows which is intended to illustrate and disclose but not limit the invention.

The improved process of this invention relates to the subsequent treatment of crude benzotriazole by whatever method formed, and applies equally as well to the diazotization procedures disclosed above or to other procedures as long as the reaction mixture to be treated contained benzotriazole oil and as long as the temperature of the reaction mixture was at least about 50° at the beginning of the treatment steps for reasons stated hereafter. Thus, for example, the method of this invention is intended to be applied to crude benzotriazole made in the manner described in U.S. Pat. No. 3,227,726, as well as in U.S. Pat. No. 2,861,078. Optimum results, however, have been achieved when the diazotization was carried out essentially in the manner described in U.S. Pat. No. 2,861,078.

GENERAL SUMMARY OF THE INVENTION

The improved process of the invention involves subsequent treatment of the diazotization reaction mixture comprising the crude benzotriazole while the mixture is at a temperature between about 50° and 110°. The treatment comprises initially adjusting the pH to about 1.0 to about 5.3, maintaining the reaction mixture at between about 50° and 110° for a time sufficient to allow completion of reaction, subsequently adjusting the pH to one in a range of about 5.0 to about 6, and separating the benzotriazole oil thus formed from the reaction mixture. The separation involves the steps of water washing, evaporating the water therefrom, distilling, condensing, and solidifying the benzotriazole oil to form the finished product.

In a preferred embodiment of this invention an aqueous solution of an alkali metal salt of benzotriazole is added to the reaction mixture containing crude benzotriazole while the reaction mixture is at a temperature between about 50° and 110°, and this solution is thereafter treated in the manner described in the paragraph above. Sodium is the preferred alkali metal salt; the addition of the benzotriazole salt to the reaction mixture is not necessary for the production of a high quality product, but provides a simple and effective means for recovery of the benzotriazole which would otherwise be lost during the water washing, steam distillation and other steps used to separate the product. Moreover, this sodium benzotriazole from previous batches may be recycled into subsequent benzotriazole batches to increase the yield thereof.

The overall reaction for the production of benzotriazole is illustrated by the reaction scheme which follows:

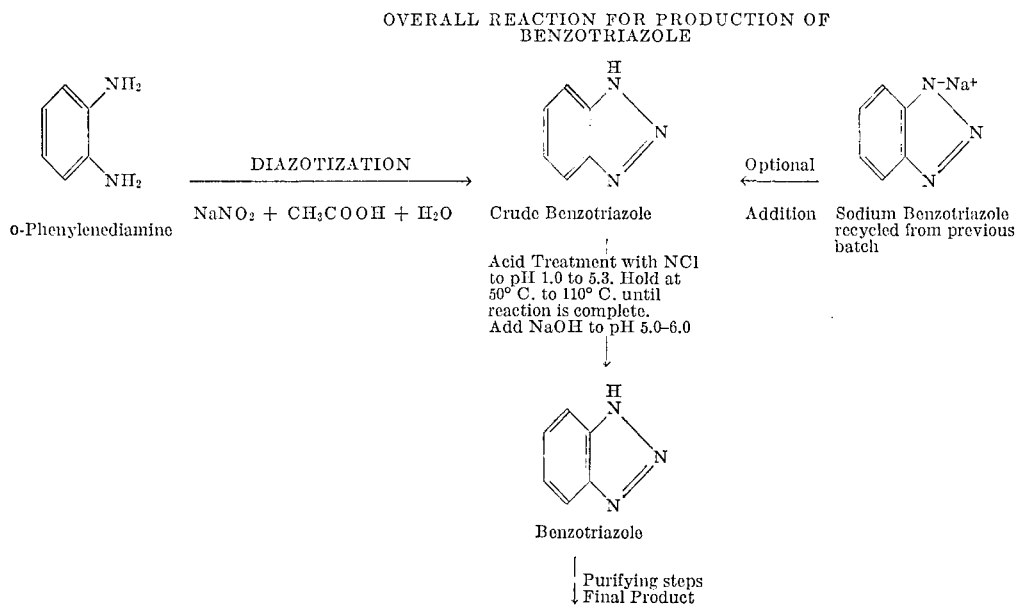

some dissolved benzotriazole, it was then pumped into the mother liquor hold tank and the washed benzotriazole oil was pumped into an evaporator. In the evaporator the water was stripped from the benzotriazole oil leaving crude dry benzotriazole oil. The evaporator was maintained at a temperature of 125°–150° and 80–100 millimeters of mercury pressure in order to insure that a minimum of benzotriazole was lost. The distillate from the evaporator was condensed and returned to the mother liquor hold tank. The dry crude benzotriazole oil at 125° was then charged into a continuous still maintained at 155°–175° and 3–5 millimeters of mercury pressure where it was distilled. The still residue was pumped into the mother liquor hold tank and the distilled benzotriazole was condensed and came out of the condenser at 105°–110°. Inasmuch as the melting point of the distilled benzotriazole oil is between 96° and 98°, during subsequent processing steps the temperature of the benzotriazole oil was maintained at all times above this figure, and usually, about 5° to 10° above this figure. The distilled dry molten benzotriazole was then fed in a thin film onto a continuous stainless steel belt cooled to 20°–30° which solidified the benzotriazole. At the edge of the belt the solidified sheet was flaked off and dropped into a grinder and further processed. The percent yield on the benzotriazole produced in accordance with the above method was about 97 percent.

The following examples are presented solely for the purpose of further illustrating and disclosing the invention, and are in no way to be construed as limitations thereon.

EXAMPLE I

Benzotriazole was produced from o-phenylenediamine, sodium nitrite and acetic acid according to the following procedure:

A solution of 3002 parts (as used herein the terms "percent" and "parts" mean percent and parts by weight, unless otherwise indicated) of sodium nitrite in 11,000 parts of water was placed in a mixing tank equipped with a mechanical stirrer. A mixture of 4500 parts of o-phenylenediamine and 2624 parts acetic acid in 1746 parts water was then added to the solution in the mixing tank, with stirring, which was continued until completion of the procedure (about 40–60 minutes). After the amine-acetate (o-phenylenediamine plus acetic acid solution) addition was completed the mixing tank contained a hot solution of wet benzotriazole oil in water at a temperature of about 90°. To this solution was added 2320 parts of aqueous sodium benzotriazole solution (230–350 parts sodium benzotriazole) which had been recovered from a previous acid treatment process in a manner described below. With the addition of the aqueous sodium benzotriazole solution the pH of the solution rose to about 7.0. The solution was then fed in increments containing about 290 parts of crude benzotriazole each, to an acid treatment vessel. Hydrochloric acid was added to each increment to reduce the pH thereof to 5. Each increment was then held at 80° for 30 minutes and sodium hydroxide was then added to bring the pH to 5.8. The solution was then pumped into a reaction mixture decanter and cooled to 50–55° at which time benzotriazole oil separated from the mother liquor. The mother liquor was then syphoned off and pumped into a mother liquor hold tank where it is preferably held at 50°–60°, and the benzotriazole oil was pumped through a wet oil wash column where the benzotriazole oil was washed with water. Because the wash water contained The benzotriazole mother liquor was treated to provide the sodium benzotriazole used as described in the first paragraph of this example. The treatment involved first filtering and discarding the solid waste. Incremental portions of the filtrate containing about 5 parts by weight of benzotriazole were then treated with 1–5 volumes of 2-ethylhexanol solvent per volume of filtrate to extract the benzotriazole. The solvent-filtrate mixture was filtered and thereafter the solvent was separated from the aqueous layer. The aqueous layer was discarded, and the solvent containing extracted benzotriazole was pumped into a back extractor containing a 10 percent aqueous sodium hydroxide solution in a quantity such that the mole ratio was 1.1 to 1.0 with reference to the benzotriazole in the solvent. The sodium salt of benzotriazole which formed was insoluble in the solvent, but soluble in water. The water solution of sodium benzotriazole which formed was separated from the 2-ethylhexanol and was subjected to steam distillation to vaporize the small amount of entrained solvent therefrom. The aqueous sodium benzotriazole was pumped into a hold tank for use as described in the first paragraph of this example.

Solvents other than 2-ethylhexanol can be used in the back extraction step. A preferred solvent is diisobutyl ketone. Other solvents which can be used include higher alkyl alcohols such as heptanol and lauryl alcohol, n-butyl acetate, iso-amyl acetate and nitrobenzene. From a cost and safety viewpoint, however, these latter solvents are not as preferred.

The chief criteria for the solvent is that it must be a solvent for benzotriazole in which a benzotriazole salt is not soluble; it must be substantially water immiscible, unreactive with benzotriazole, and sufficiently low boiling that a complete separation thereof can be effected, e.g. by steam distillation of an aqueous sodium benzotriazole solution.

The purity of the benzotriazole produced by the above method was determined by means of a color measurement method which consisted of using a Klett Summersen colorimeter. The procedure consisted of first preparing a sample by dissolving 20 grams of benzotriazole in sufficient methanol to make a final volume of 50 ml. Using methanol in the 4 cm. cell path the galvanometer in the colorimeter was first adjusted to zero using a blue No. 42 filter. The sample was then measured in the same way, and the reading taken corresponds to the Klett number referred to herein. Benzotriazole having a Klett number of less than 300 at the above concentration is considered to be "photo grade." The benzotriazole produced as above described was "photo grade" and had a Klett number of 190. Benzotriazole produced in accordance with the above method, but without the acid treatment, was yellow, was too highly colored for the determination of a Klett number at the above concentration and was technical grade.

There are several processing conditions which should be observed in the practice of this invention. For optimum results the pH of the reaction mixture at the start of the acid treatment should be above about 5.8. After the recycled sodium benzotriazole has been added to the reaction mixture, causing the pH to rise, the pH is lowered by the addition of acid to the range of about 1.0 to about 5.3. Any mineral acid is suitable for use in lowering the pH; however, hydrochloric acid is the most preferred because a cleaner separation and a higher purity of benzotriazole is obtained. In addition, while the pH may range from 1.0 to about 5.3, the preferred range is from about 3.0 to about 5.0, and the optimum is substantially 5. After the pH has been lowered, it is also preferred to hold the mixture at about 80° for about 30 minutes; however, both the temperature and the time can be varied somewhat as long as reaction is allowed to proceed substantially to completion. Times as short as 5 minutes and as long as about 2 hours have been found to be suitable. The temperature should not be allowed to go below about 50°, however, due to the danger of benzotriazole crystallization, nor above about 110° which is the reflux temperature. After the holding step, the pH is adjusted to about 5.0–6.0. The preferred agent for this purpose is caustic for economic reasons and because a better separation of benzotriazole is obtained; however, other alkali bases such as potassium hydroxide, ammonium hydroxide or sodium carbonate can be used. It is preferred to raise the pH to about 5.8 to 6.0, 5.8 being optimum.

After the final pH adjustment, in order to get optimum separation of the mother liquor from the benzotriazole oil, the temperature of the mixture should be dropped to about 50°–55°. Even at this temperature some water is contained in the oil; therefore, it is necessary to evaporate the water in a subsequent processing step. In the water evaporation step, it is desirable that the temperature of the evaporator be no more than about 125° in order to minimize loss of benzotriazole with the water.

As previously stated, it is not essential, in order to obtain the improved quality product, that the aqueous sodium benzotriazole solution be added to the original reaction mixture. Thus, for example, if the original reaction mixture were treated by lowering the pH to about 5.0, holding at 80° for 30 minutes, then raising the pH to about 5.8, without adding aqueous sodium benzotriazole, and carrying out the subsequent processing steps described herein, a "photo grade" product would be obtained, but in that event the purification yield would be about 70 percent. By recycling the aqueous sodium benzotriazole to the reaction mixture which has been recovered from the processing step of a prior batch as previously described, the yield is about 97 percent.

It is not known exactly why treating the reaction mixture with acid has the effect of improving the purity of the finished product. However, it is clear that, at the low pH, a compound formed by reaction between the diazotized o-phenylenediamine and undiazotized o-phenylenediamine breaks down to give the benzotriazole and o-phenylenediamine which is then free to diazotize. Moreover, other impurities such as o-nitroaniline which are often present in the o-phenylenediamine are changed in some way so that these impurities do not co-distill with the benzotriazole.

The improved color grade of benzotriazole which has been produced in accordance with the acid treatment process described herein, as compared to that which has not undergone the acid treatment process, is demonstrated in the following example.

EXAMPLE II

A 2 mole solution of benzotriazole was prepared from ortho-phenylenediamine, sodium nitrite and acetic acid according to the following procedure. A flask was charged with 226.4 grams of ortho-phenylenediamine, 160.2 grams of sodium nitrite, and 604.0 grams of water; the mixture being stirred continually until completion of the procedure. A 137.8 gram portion of glacial acetic acid was then added to the slurry in the flask over a period of about 27 minutes. Because of the exothermic nature of the reaction an ice bath was applied when the temperature reached 69°. After the acetic acid addition was complete the flask contained a hot emulsion of wet benzotriazole oil in water at a temperature of about 65°. The solution was then heated to 75° and held at that temperature for 5 minutes. After cooling to 50–55°, the solution contained approximately 725 ml. of mother liquor and 220 ml. of benzotriazole oil. The oil was separated from the mother liquor and divided into two equal portions, each portion being recombined with one-half of the mother liquor. One of the portions of benzotriazole oil which was combined with the mother liquor was then further treated in accordance with the following manner. While the benzotriazole oil-mother liquor solution was at a temperature of 56° and at a pH of about 5.7 (the natural pH of the solution) the pH was adjusted to 5.0 with the addition of 23 ml. of commercial grade hydrochloric acid (37 percent). When the pH was reduced to 5.0 the hydrochloric acid addition was discontinued and the mixture (then at a temperature of 57°) was heated to 80° and held at this temperature for one-half hour. Thereafter the mixture was cooled to 54° and 72 ml. of sodium hydroxide (10 percent solution) was added to bring the pH to 5.8. At this point the mother liquor was separated from the benzotriazole oil by decantation and the oil was further processed by water washing, evaporating the water therefrom, distilling, condensing and solidifying the benzotriazole oil to form a finished product in the manner described herein. The second portion of benzotriazole oil was treated in exactly the same manner except that the acid treatment step was omitted, i.e. after the separation of the benzotriazole oil into the two portions, the portion which was not to be acid treated was thereafter water washed, distilled, condensed and solidified as described above.

The color of the solid benzotriazole which had been produced in accordance with the acid treating process of this invention (No. 1 below) and that which had not undergone the acid treating step (No. 2 below) was measured on the Klett scale with the following results:

TABLE I

|  | Assays, percent | Klett color |
|---|---|---|
| No. 1 (acid treated) | 99.99 | 182 |
| No. 2 (non-acid treated) | 99.67 | 478 |

It has thus been demonstrated that benzotriazole produced in accordance with the acid treating method of this invention exhibits significantly improved color characteristics as compared to benzotriazole which has not been subjected to the acid treating step.

EXAMPLE III

To determine the effect on the final product of the temperature at which the acid treatment of the benzotriazole oil is carried out, a 3 mole solution of benzotriazole oil was prepared in accordance with the method described in Example I above and divided into three equal parts. The first part was subjected to the acid treatment step, at a temperature ranging from 50°–55° (i.e. while the benzotriazole oil was at a temperature of between 550°–55°, the pH was reduced to 5.0, the solution held for ½ hour, and then the pH was raised to 5.8). The second portion was subjected to the acid treatment step at a temperature ranging from 80° to 85°, and the third portion was subjected to the acid treatment step at a temperature ranging from between 100° and 110° (reflux). The three portions were then washed, distilled and further processed in the manner described in Example I above.

Thereafter the three portions were tested on the Klett color scale with the following results:

TABLE II

|  | Temperature of benzotriazole oil while undergoing acid treatment, degrees | Klett color |
|---|---|---|
| Part No.: |  |  |
| 1 | 50–55 | 246 |
| 2 | 80–85 | 216 |
| 3 | 100–110 | 239 |

It can thus be seen that the acid treating step described herein can be carried out at temperatures ranging from about 50° to 110° or reflux with no substantial variation in color characteristics. At temperatures below about 50° separation of the components and crystallization of benzotriazole from solution will result, while at temperatures above about 110° the benzotriazole oil will volatilize. It is, therefore, essential that the acid treating step be conducted within a temperature within the range of about 50° to about 110°, and preferably at about 80°.

EXAMPLE IV

The effect of varying the time for which the benzotriazole oil is held after the intial pH adjustment is shown in this example. A four mole solution of benzotriazole oil was prepared in accordance with the method described in Example I and after separation of the benzotriazole oil from the mother liquor, the benzotriazole oil was divided into four approximately equal portions. Each portion was then subjected to the acid treatment as described herein with the exception that instead of holding the solution for one-half hour at 80° after the initial downward pH adjustment as indicated in Example I, the four portions were treated, respectively, for 5 minutes (part 1), 30 minutes (part 2), 60 minutes (part 3) and 120 minutes (part 4). Thereafter all four portions were processed in accordance with the method described herein which included water washing, distillation, condensing, solidification and drying. In each instance, the acid treatment step was carried out at a temperature ranging from 80° to 85°. The result of varying the time for which the solution is held after the initial pH adjustment is indicated below.

TABLE III

|  | Time for acid treatment, minutes | Klett color |
|---|---|---|
| Part: |  |  |
| 1 | 5 | 181 |
| 2 | 30 | 148 |
| 3 | 60 | 196 |
| 4 | 120 | 206 |

It will be seen from the above example that while significantly improved color characteristics can be achieved by holding the benzotriazole solution, after the initial pH adjustment, for times ranging from 5 minutes to 2 hours, the best results in terms of color reduction and improved quality are achieved when the benzotriazole oil is held for about 30 minutes after the initial pH adjustment.

EXAMPLE V

This example demonstrates the effect of the specific pH of the acid treatment on the Klett color of the final product. Several batches of a solution of benzotriazole oil were prepared in accordance with the method described in Example I. Each batch was subjected to the acid treatment as described herein. The only difference was that the acid treatment was carried out at a different pH within the range of pH 1 to 5.5. In Table IV, below, the pH for acid treatment of each batch is given, and the Klett color of the benzotriazole thus treated. With the exception of batch 6, the acid treatment was for a period of 30 minutes at 80°. Batch 6 was treated for only 5 minutes. Hydrochloric acid was used except for batch 5 for which sulfuric acid was used.

TABLE IV

|  | pH of acid treatment | Klett color |
|---|---|---|
| Batch No.: |  |  |
| 1 | 1.0 | 280 |
| 2 | 3.0 | 228 |
| 3 | 4.5 | 283 |
| 4 | 5.0 | 197 |
| 5 | 5.0 | 238 |
| 6 | 5.0 | 196 |
| 7 | 5.0 | 181 |
| 8 | 5.5 | 358 |

Table IV shows the best results are achieved when the acid treatment is carried out at a pH between about 1 and 5, with the best color obtained at a pH of 5.

It should be appreciated that suitable modifications can be made in the above described process without departing from the spirit and scope of this invention.

What I claim is:

1. In the method for producing benzotriazole which method comprises diazotizing o-phenylenediamine, the improvement which comprises adjusting the pH of the diazotization reaction mixture containing crude benzotriazole to about 1.0 to about 5.3, while the reaction mixture is at a temperature of between about 50° and about 110°, holding the reaction mixture at a temperature within the indicated range until reaction is complete, subsequently adjusting the pH of the reaction mixture to about 5.0 to about 6.0, and thereafter separating the benzotriazole from the reaction mixture.

2. The method of claim 1 wherein the initial pH adjustment is made with a mineral acid selected from HCl or $H_2SO_4$, the subsequent pH adjustment is made with an alkali metal hydroxide, and the reaction time at said temperature is at least about 5 minutes but not more than about 2 hours.

3. The method of claim 2 in which the initial pH adjustment is made with HCl to a pH of 5, and the subsequent pH adjustment is made with NaOH to a pH of 5.8.

4. The method of claim 1 wherein the separated benzotriazole oil is further treated by a method which comprises washing with water, evaporation of the water retained by the benzotriazole oil, distilling, condensing, and solidifying.

5. The method of claim 4 which method further comprises retaining the water used in the further treatment of the benzotriazole oil, isolating the benzotriazole dissolved therein, converting the benzotriazole to an alkali metal salt, and adding the alkali metal salt of benzotriazole to a subsequent diazotization reaction mixture containing crude benzotriazole in order to increase the total yield thereof.

6. The method of claim 5 wherein the recovery of the benzotriazole from the water and conversion to the alkali metal salt comprises filtering off the impurities in the water solution, adding a water-immiscible solvent to the water solution in order to dissolve the benzotriazole contained therein, decanting the solvent and dissolved benzotriazole from the water, adding aqueous alkali metal hydroxide to form the alkali salt of the benzotriazole and thereby extracting the benzotriazole from the solvent, decanting the solvent from the aqueous alkali metal hydroxide and the alkali metal benzotriazole dissolved therein, and steam vaporizing to remove any residual solvent.

7. The method of claim 5 wherein the solvent is 2-ethylhexanol or diisobutyl ketone.

8. The method of claim 5 wherein the alkali metal hydroxide is sodium hydroxide.

9. In the method for producing benzotriazole which comprises admixing in an aqueous system at least one mole of o-phenylenediamine, at least one chemical equivalent of an acid reacting substance, selected from the group consisting of aliphatic monobasic acids, ($H_2PO_4$)-salts, citric acid, carbonic acid, glycolic acid, and aliphatic dibasic acids selected from the group consisting of oxalic acid, malonic acid, succinic acid and diglycolic acid, and at least one equivalent of a metal nitrite, the improvement which comprises bringing the temperture of the resultant reaction mixture containing crude benzotriazole to a temperature between about 50° and about 110°, initially reducing the pH of the reaction mixture to one from about 3.0 to about 5.0 by the addition of acid, holding the reaction mixture at a temperature within said range for a time sufficient to allow completion of reaction, subsequently increasing the pH of the reaction mixture to about 5.0 to about 6.0 by the addition of a base, and separating the benzotriazole oil from the reaction mixture.

10. The method of claim 9 in which the acid comprises HCl or $H_2SO_4$, and the base comprises an alkali metal hydroxide.

11. The process of improving the quality of benzotriazole formed by the diazotization of o-phenylenediamine which comprises maintaining the temperature of the diazotization reaction mixture containing crude benzotriazole between about 50° and about 110°, admixing in the diazotization reaction mixture an aqueous solution of the sodium salt of benzotriazole which is recovered from mother liquor, adding thereto acid in a sufficient quantity to reduce the pH of the solution to about 1.0 to about 5.3, holding the solution at about 80° for about 30 minutes, adding thereto sufficient base to increase the pH of the reaction mixture from about 5.0 to about 6.0, separating the benzotriazole oil formed from the mother liquor, and thereafter water washing, evaporating water therefrom, distilling, condensing, and solidifying said benzotriazole oil.

12. The process for improving the quality of benzotriazole formed by the diazotization of o-phenylenediamine, which process comprises maintaining the temperature of the diazotization reaction mixture above about 80°, admixing in the reaction mixture so formed and containing crude benzotriazole an aqueous solution of the sodium salt of benzotriazole, reducing the pH of the reaction mixture to between about 3.0 and about 5.0 with HCl, maintaining the temperature of a reaction mixture at about 80° for about 30 mintues, increasing the pH of the reaction mixture to about 5.8 with NaOH, separating the benzotriazole oil formed in the diazotization reaction from the mother liquor, and thereafter water washing, evaporating the water therefrom, distilling, condensing, and solidifying said benzotriazole oil to form the finished product.

References Cited

UNITED STATES PATENTS

| | | | |
|---|---|---|---|
| 2,861,078 | 11/1958 | Miller et al. | 260—308 |
| 3,227,726 | 1/1966 | Levy | 260—308 |

ALTON D. ROLLINS, Primary Examiner